(12) United States Patent
Nishikai et al.

(10) Patent No.: US 10,986,246 B2
(45) Date of Patent: Apr. 20, 2021

(54) REMOTE MANAGEMENT SYSTEM FOR REMOTELY MANAGING IMAGE FORMING APPARATUS

(71) Applicant: KYOCERA DOCUMENT SOLUTIONS INC., Osaka (JP)

(72) Inventors: Kazuki Nishikai, Osaka (JP); Takeshi Nakamura, Osaka (JP); Satoshi Goshima, Osaka (JP); Dukil Park, Osaka (JP); Yuichi Obayashi, Osaka (JP); Takumi Nakamura, Osaka (JP); Koki Nakajima, Osaka (JP); Yasuo Nakashima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/419,876

(22) Filed: May 22, 2019

(65) Prior Publication Data

US 2019/0364168 A1   Nov. 28, 2019

(30) Foreign Application Priority Data

May 25, 2018 (JP) .................. 2018-100490
Jun. 22, 2018 (JP) .................. 2018-118876

(51) Int. Cl.
*H04N 1/32* (2006.01)
*G06F 3/12* (2006.01)
*G06F 11/10* (2006.01)

(52) U.S. Cl.
CPC ......... *H04N 1/32641* (2013.01); *G06F 3/121* (2013.01); *G06F 3/1234* (2013.01);
(Continued)

(58) Field of Classification Search
None
See application file for complete search history.

(56) References Cited

U.S. PATENT DOCUMENTS

2004/0205262 A1*  10/2004  Ikeno ............... G03G 15/5079
                                                    710/15
2005/0182510 A1*   8/2005  Bress ................... G06F 3/0658
                                                    700/214
(Continued)

FOREIGN PATENT DOCUMENTS

JP    2002-041374 A    2/2002
JP    2002-271875 A    9/2002
(Continued)

*Primary Examiner* — Mohammad H Ghayour
*Assistant Examiner* — Pawan Dhingra
(74) *Attorney, Agent, or Firm* — Li & Cai Intellectual Property (USA) Office

(57) ABSTRACT

A remote management system includes: a user operation server; a remote maintenance server; and a connection server, the user operation server, the remote maintenance server, and the connection server being connected to each other via a network, the remote maintenance server including a processor that operates as a setting change receiving unit that receives a setting value change instruction for an image forming apparatus from a user via the user operation server, a first setting change detection unit that detects a changed setting value based on the setting value change instruction, a setting change informing unit that informs an administrator and a user-in-charge of the image forming apparatus of the changed setting value, and a setting change command sending unit that sends a command to change setting of the image forming apparatus to the image forming apparatus via the connection server.

3 Claims, 13 Drawing Sheets

(52) U.S. Cl.
CPC ........ *G06F 3/1259* (2013.01); *G06F 11/1004* (2013.01); *G06F 3/1288* (2013.01)

(56) References Cited

U.S. PATENT DOCUMENTS

| | | | |
|---|---|---|---|
| 2006/0168103 A1* | 7/2006 | Motoyama | H04L 69/18 709/217 |
| 2008/0137125 A1* | 6/2008 | Naitoh | H04L 41/06 358/1.14 |
| 2009/0177806 A1* | 7/2009 | Nishikawa | H04N 1/00217 710/10 |
| 2015/0124290 A1* | 5/2015 | Tajima | G06F 3/1205 358/1.15 |
| 2015/0268902 A1* | 9/2015 | Sakamoto | G06F 3/123 358/1.14 |

FOREIGN PATENT DOCUMENTS

| | | |
|---|---|---|
| JP | 2002-333996 A | 11/2002 |
| JP | 2004-221799 A | 8/2004 |
| JP | 2006-340239 A | 12/2006 |
| JP | 2008-147941 A | 6/2008 |
| JP | 2009-164902 A | 7/2009 |
| JP | 2011-150587 A | 8/2011 |
| JP | 2015-179403 A | 10/2015 |

* cited by examiner

REMOTE MANAGEMENT SYSTEM FOR REMOTELY MANAGING IMAGE FORMING APPARATUS

CROSS REFERENCE TO RELATED APPLICATION

This application claims the benefit of Japanese Priority Patent Application JP 2018-100490 filed May 25, 2018, and Japanese Priority Patent Application JP 2018-118876 filed Jun. 22, 2018, the entire contents of which are incorporated herein by reference.

BACKGROUND OF THE INVENTION

1. Field of the Invention

The present disclosure relates to a remote management system and an information processing method for managing image forming apparatuses (MFP, Multifunction Peripherals).

2. Description of Related Art

There is known a system that remotely manages several hundreds to several hundreds of thousands of image forming apparatuses.

SUMMARY OF THE INVENTION

According to an embodiment of the present disclosure, there is provided a remote management system, comprising:
a data processor server;
a remote maintenance server;
a storage; and
a connection server,
the data processor server, the remote maintenance server, the storage, and the connection server being connected to each other via a network,
the data processor server including a processor that operates as
 a latest update date-and-time check unit that checks latest update date-and-time of work information of an image forming apparatus stored in the storage,
 a data loss check unit that checks loss of the work information,
 a re-obtained data length calculation unit that calculates data length of the work information to be re-obtained,
 a re-obtaining start time determination unit that determines time at which the work information is to be re-obtained from the image forming apparatus, and
 a re-obtain request sending unit that adds the re-obtain request into a queue, and sends the queue to the remote maintenance server, the re-obtain request having the determined data length and re-obtaining start time,
the remote maintenance server including a processor that operates as
 a work information collecting unit that collects the work information from the image forming apparatus, and stores the collected work information in the storage,
 a re-obtain request receiving unit that retrieves and receives the re-obtain request from the queue,
 a re-obtain request conversion unit that converts the re-obtain request into a re-obtain command, the re-obtain command having a format that the image forming apparatus can interpret, and
 a re-obtain command sending unit that sends the converted re-obtain command via the connection server to an image forming apparatus, the image forming apparatus requesting to re-obtain the work information.

According to an embodiment of the present disclosure, there is provided a remote management system, comprising:
a user operation server;
a remote maintenance server; and
a connection server,
the user operation server, the remote maintenance server, and the connection server being connected to each other via a network,
the remote maintenance server including a processor that operates as
 a setting change receiving unit that receives a setting value change instruction for an image forming apparatus from a user via the user operation server,
 a first setting change detection unit that detects a changed setting value based on the setting value change instruction,
 a setting change informing unit that informs an administrator and a user-in-charge of the image forming apparatus of the changed setting value, and
 a setting change command sending unit that sends a command to change setting of the image forming apparatus to the image forming apparatus via the connection server.

According to an embodiment of the present disclosure, there is provided a remote management system, comprising:
a remote maintenance server;
a data processor server;
a storage; and
an image forming apparatus,
the remote maintenance server, the data processor server, the storage, and the image forming apparatus being connected to each other via a network,
the image forming apparatus including a processor that operates as
 a setting change unit that directly receives setting change from an operation device, a manager tool, a web server for setting provided by an image forming apparatus, and a print command, and changes setting of the image forming apparatus, and
 a setting value transmitting unit that transmits setting values of the image forming apparatus to the remote maintenance server at regular intervals,
the remote maintenance server including a processor that operates as
 a setting value collecting unit that collects setting values from the image forming apparatus at regular intervals, and stores the setting values in time series in the storage,
 a setting change receiving unit that receives the changed setting value detected by the data processor server from the data processor server,
 a setting change informing unit that informs an administrator and a user-in-charge of the image forming apparatus of the changed setting value, and
 a setting restoring unit that executes a restoring process of restoring an original setting value if an important setting item is changed,
the data processor server including a processor that operates as
 a second setting change detection unit that checks the setting values stored in time series in the storage, checks whether or not the setting value is changed, and informing the remote maintenance server of the changed setting value if the setting value is changed.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings.

First Embodiment

[Entire Configuration]

Figure 1:
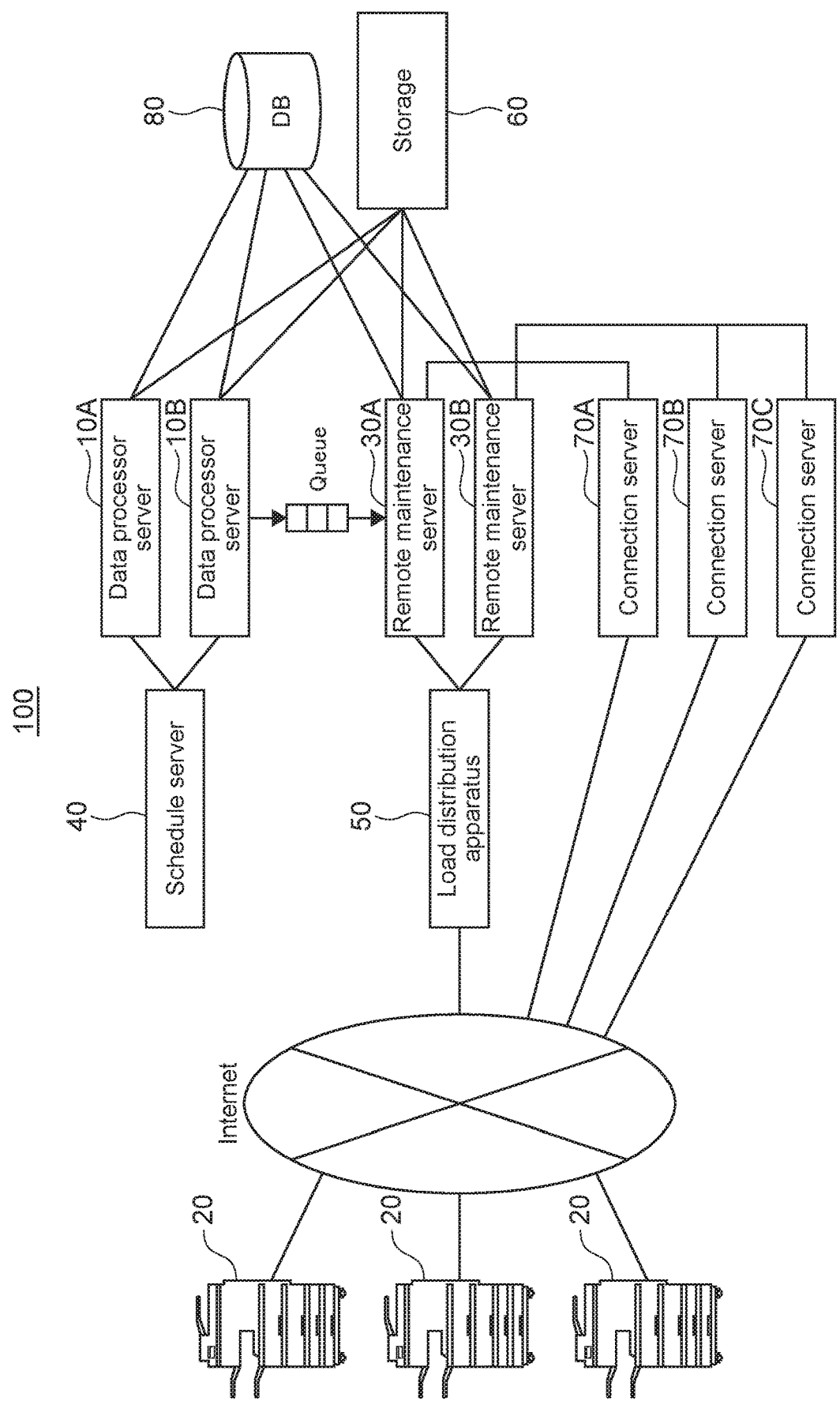
FIG. 1 shows an entire configuration of the remote management system 100 according to a first embodiment of the present disclosure.

Firstly, an entire configuration of the remote management system 100 according to a first embodiment of the present disclosure will be described. FIG. 1 shows an entire configuration of the remote management system 100 according to a first embodiment of the present disclosure.

The remote management system 100 includes the load distribution apparatuses 50, the remote maintenance servers 30 (hereinafter, the remote maintenance servers 30A and 30B are collectively referred to as the remote maintenance server(s) 30), the data processor servers 10, the schedule server 40, the DB (database) 80, the storage 60, and the connection server 70, which are connected to each other via a network.

End points from the Internet includes the load distribution apparatus 50, the connection server 70A, the connection server 70B, and the connection server 70C. The load distribution apparatus 50 distributes accesses from the image forming apparatuses 20 to the remote maintenance servers 30A and 30B.

The load distribution apparatus 50 distributes accesses from the image forming apparatuses 20 to the remote maintenance servers 30A and 30B.

The remote maintenance server 30 remotely maintains the image forming apparatuses 20 that the remote maintenance server 30 manages. For example, the remote maintenance server 30 collects, once a day, daily work information (toner consumption, number of print, etc.), stores the daily work information in the DB 80 and the storage 60, updates firmware of the image forming apparatuses 20.

The DB 80 stores the latest work information.

The storage 60 stores all the daily work information of each image forming apparatus 20.

The connection server 70 is a server that executes management connection to the image forming apparatuses 20 in order to send management commands to the image forming apparatuses 20 managed in the remote management system 100.

The management connection is continued until the image forming apparatus 20 is powered off.

The image forming apparatus 20 connected to the network firstly connects to the remote maintenance server 30 via the load distribution apparatus 50, and obtains a response. The response specifies the connection server 70 to which management connection is to be established. After that, the image forming apparatus 20 shuts down the connection to the remote maintenance server 30, connects to the specified connection server 70, and establishes the management connection.

The data processor server 10, which is activated at regular intervals by the schedule server 40, checks loss of work information stored in the storage 60. If there is loss of the work information, the data processor server 10 calculates the data length of work information to be re-obtained and re-obtaining start time. In addition, the data processor server 10 adds a re-obtain request into a queue, and sends the queue to the remote maintenance server 30.

The remote maintenance server 30 retrieves and receives the re-obtain request from the queue, and converts the re-obtain request into a re-obtain command, the re-obtain command having a format that the image forming 20 apparatus can interpret. In addition, the remote maintenance server 30 sends the converted re-obtain command via the connection server 70 to the image forming apparatus 20.

An entire configuration of the remote management system 100 has been described above. Note that, for example, FIG. 1 shows the three connection servers 70. This is merely an example. Actually, the number of the connection servers 70 is not limited.

[Configuration of Data Processor Server]

Figure 2:
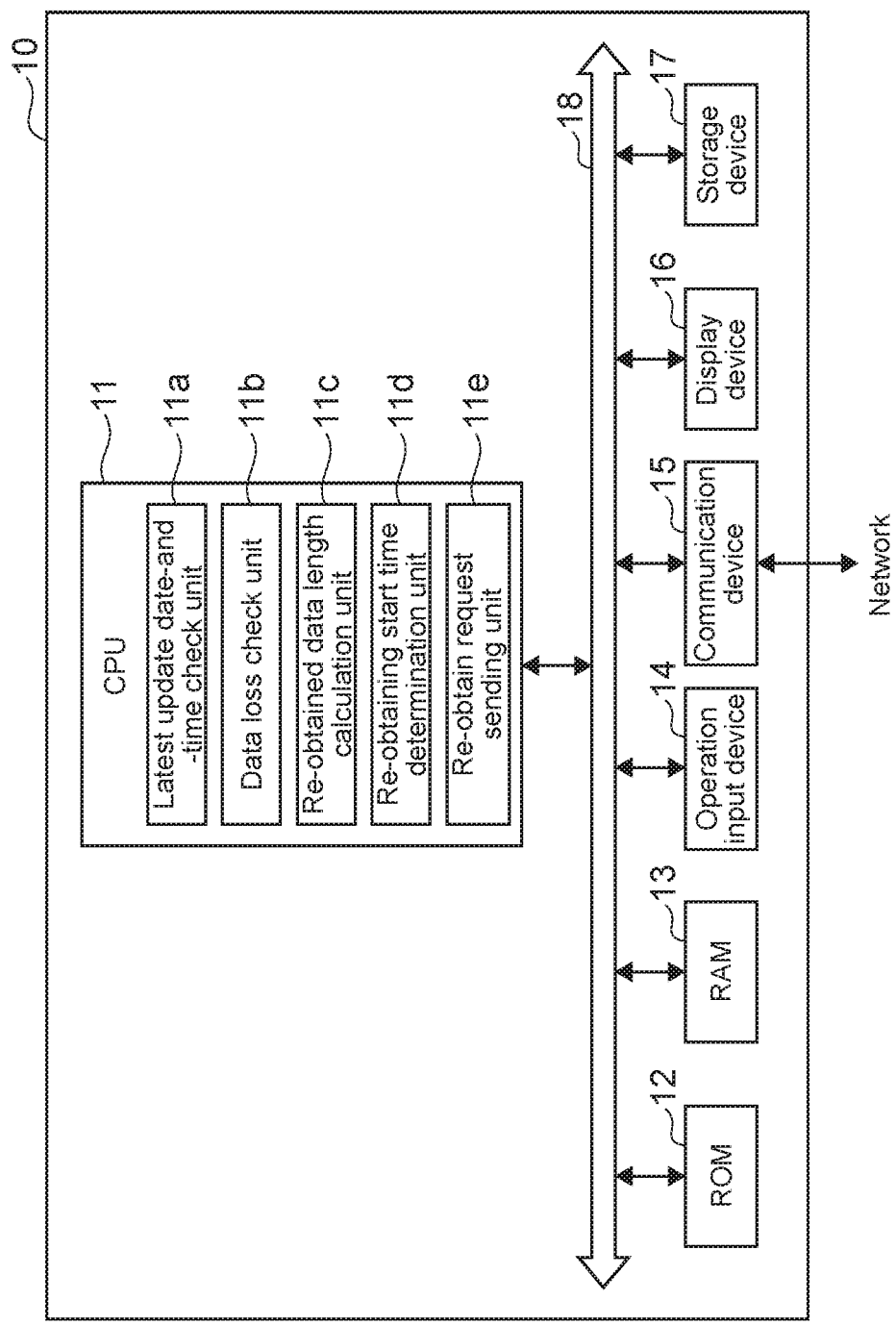
FIG. 2 shows a block configuration of the data processor server 10, where the data processor server 10 is a general-purpose computer.

Next, a configuration of the data processor server 10 will be described. The data processor server 10 may include dedicated hardware or software or a general-purpose computer. FIG. 2 shows a block configuration of the data processor server 10, where the data processor server 10 is a general-purpose computer.

As shown in FIG. 2, the data processor server 10 includes a CPU (Central Processing Unit) 11, a ROM (Read Only Memory) 12, a RAM (Random Access Memory) 13, an operation input device 14, a communication device 15, a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, and various types of data.

The communication device 15 is connected to a network for sending/receiving information to/from apparatuses.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the remote maintenance server 10 realizes are the latest update date-and-time check unit 11a, the data loss check unit 11b, the re-obtained data length calculation unit 11c, the re-obtaining start time determination unit 11d, and the re-obtain request sending unit 11e.

The latest update date-and-time check unit 11a checks the latest update date-and-time of work information of each image forming apparatus 20 stored in the storage 60. If the difference between the present date-and-time and the latest update date-and-time is equal to or more than one day, the newest work information may not have been sent because of a communication error or the like. So, data loss is checked next.

The data loss check unit 11b checks a communication error and the like, and checks loss of the work information of each image forming apparatus 20 stored in the storage 60. Since one work information is stored for one day, if there is no work information for a day, it means that work information of that day is lost. Further, when the image forming apparatus 20 sends work information, the image forming apparatus 20 adds a checksum to the work information. So, by verifying a checksum, it is possible to check whether the stored work information is appropriate or there is loss of work information.

The re-obtained data length calculation unit 11c calculates the data length of work information to be re-obtained. Work information per day is re-obtained. The data length of work information of a day is constant. So if there is loss of two days, the data length is twice of the data length of one day. If there is loss of three days, the data length is three times of the data length of one day. In order to make data to be re-obtained small so as to less affect the remote management system 100, for example, if there is loss of two days, the work information to be re-obtained is divided for each day and obtained. In other words, the re-obtained data length calculation unit 11c divides the work information to be re-obtained if the data length of the re-obtain work information is larger than a threshold.

The re-obtaining start time determination unit 11d determines, as the time at which the work information is to be re-obtained from the image forming apparatus 20, time at which a load of the remote management system 100 is small.

The re-obtain request sending unit 11e adds the re-obtain request into a queue, and sends the queue to the remote maintenance server 30, the re-obtain request having the determined data length and re-obtaining start time.

A configuration of the data processor server 10 has been described above.

[Configuration of Remote Maintenance Server]

Figure 3:
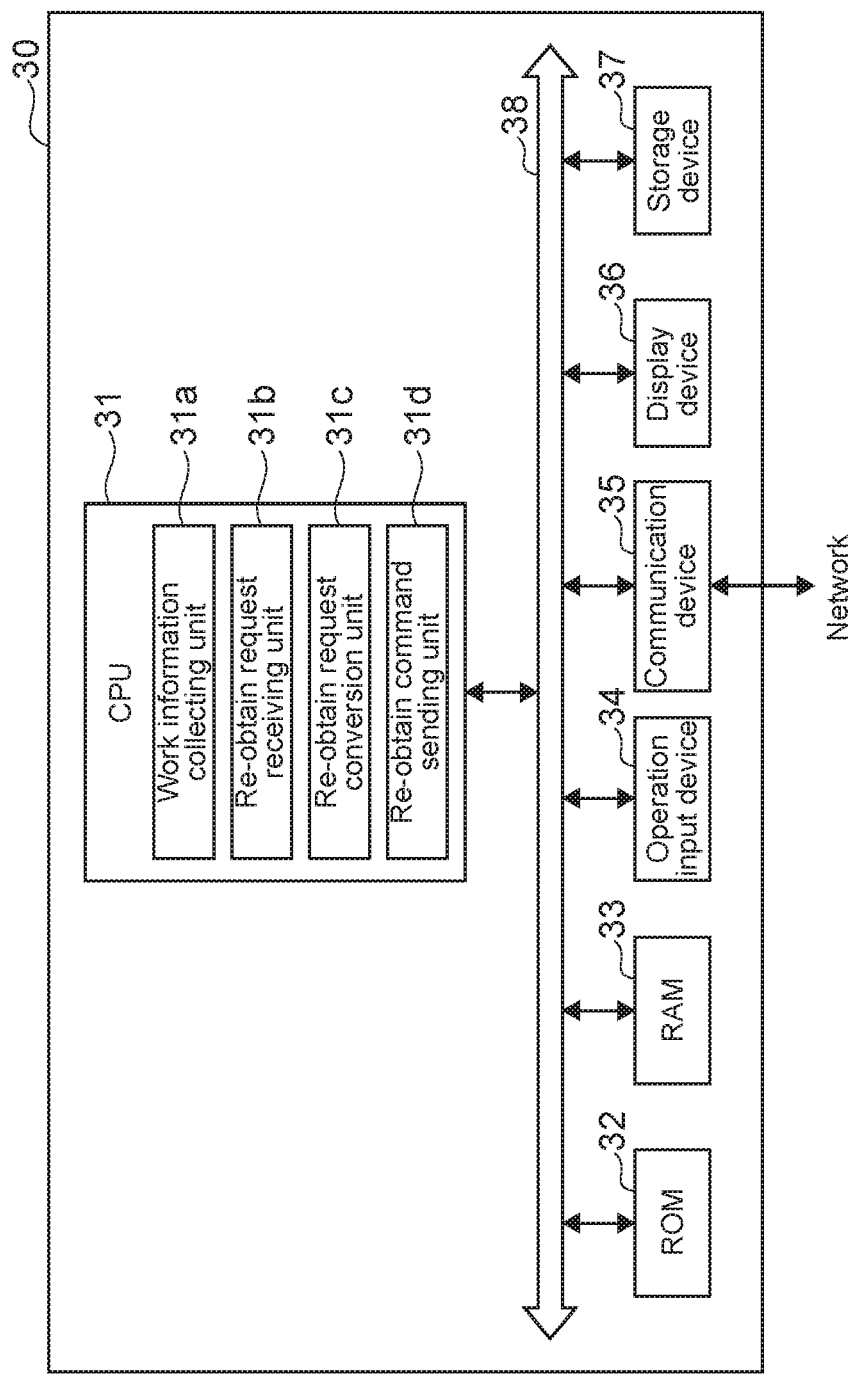
FIG. 3 shows a block configuration of the remote maintenance server 30, where the remote maintenance server 30 is a general-purpose computer.

Next, a configuration of the remote maintenance server 30 will be described. The remote maintenance server 30 may include dedicated hardware or software or a general-purpose computer. FIG. 3 shows a block configuration of the remote maintenance server 30, where the remote maintenance server 30 is a general-purpose computer.

As shown in FIG. 3, the remote maintenance server 30 includes a CPU 31, a ROM 32, a RAM 33, an operation input device 34, a communication device 35, a display device 36, a storage device 37, and these blocks are connected to each other via a bus 38.

The ROM 32 stores a plurality of programs such as firmware for executing various types of process, and data. The RAM 33 is used as a work area of the CPU 31 and temporarily stores an OS, various applications being executed, and various types of data being processed.

The storage device 37 is, for example, an HDD (Hard Disk Drive), a flash memory, or other nonvolatile memories. The storage device 37 stores the OS, various applications, and various types of data.

The communication device 35 is connected to a network for sending/receiving information to/from apparatuses.

Of the plurality of programs stored in the ROM 32 or the storage device 37, the CPU 31 loads a program in the RAM 33 in response to a command input via the operation input device 34, and appropriately controls the display device 36 and the storage device 37 according to the loaded program.

The operation input device 34 is, for example, a pointing device such as a mouse, a keyboard, a touch panel, or other operation devices.

The display device 36 is, for example, a liquid crystal display, an EL display, or a plasma display.

Next, functional blocks will be described. When the CPU 31 executes a program, the CPU 31 operates as the functional blocks described below.

The functional blocks that the CPU 31 of the remote maintenance server 30 realizes are the work information collecting unit 31a, the re-obtain request receiving unit 31b, the re-obtain request conversion unit 31c, and the re-obtain command sending unit 31d.

The work information collecting unit 31a collects, via the load distribution apparatus 50, the work information from the image forming apparatus 20, and stores the collected work information in the DB 80 and the storage 60.

The re-obtain request receiving unit 31b retrieves and receives the re-obtain request from the queue.

The re-obtain request conversion unit 31c converts the re-obtain request, which is retrieved and received from the queue, into a re-obtain command, the re-obtain command having a format that the image forming apparatus 20 can interpret.

The re-obtain command sending unit 31d sends the converted re-obtain command via the connection server 70 to the image forming apparatus 20, the image forming apparatus 20 requesting to re-obtain the work information.

A configuration of the remote maintenance server 30 has been described above.

[Processing Flow]

Figure 4:
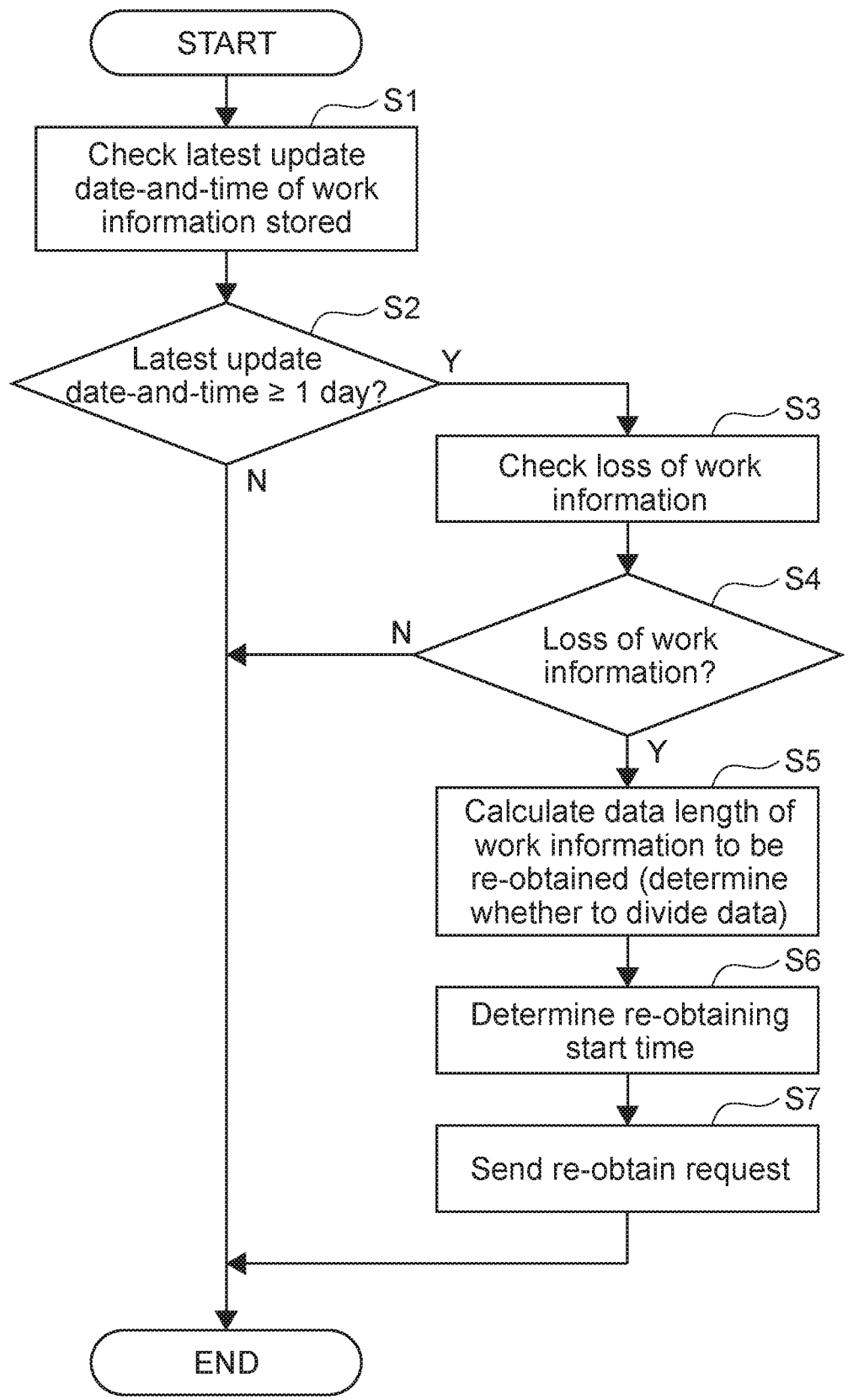
FIG. 4 shows a processing flow of sending a re-obtain request from the data processor server 10 of the remote management system 100.

Next, a processing flow of sending a re-obtain request from the data processor server 10 of the remote management system 100 will be described. FIG. 4 shows a processing flow of sending a re-obtain request from the data processor server 10 of the remote management system 100.

Firstly, the latest update date-and-time check unit 11a of the data processor server 10, which is activated by the schedule server 40, checks the latest update date-and-time of work information of each image forming apparatus 20 stored in the storage 60 (Step S1).

Next, the latest update date-and-time check unit 11a determines whether or not the difference between the present date-and-time and the latest update date-and-time of the work information is equal to or more than one day (first threshold) (Step S2).

If the difference between the present date-and-time and the latest update date-and-time is equal to or more than one day (Step S2, N), the process is finished.

If the difference between the present date-and-time and the latest update date-and-time is equal to or more than one day (Step S2, Y), next, the data loss check unit 11b checks loss of the work information stored in the storage 60 (Step S3).

Next, the data loss check unit 11b determines whether or not there is loss of the work information (Step S4).

If there is no loss (Step S4, N), the process is finished.

If there is loss (Step S4, Y), next, the re-obtained data length calculation unit 11c calculates the data length of work information to be re-obtained (Step S5). Note that, when the re-obtained data length calculation unit 11c calculates the data length, the re-obtained data length calculation unit 11c determines whether to divide and obtain the work information to be re-obtained.

Next, the re-obtaining start time determination unit 11d determines, as the time at which sending of the work information to be re-obtained is started, time at which a load of the remote management system 100 is small (Step S6).

Next, the re-obtain request sending unit 11e adds the re-obtain request for work information of loss into a queue, and sends the queue to the remote maintenance server 30. Then the process is finished (Step S7).

A processing flow of sending a re-obtain request from the data processor server 10 of the remote management system 100 has been described above.

Second Embodiment

Then, the remote management system 100A according to a second embodiment of the present disclosure will be described. In the second embodiment, if setting of the image forming apparatus 20 is changed via the remote management system 100A, the change of a setting value is detected, and a person-in-charge is informed of that. If it is an important setting value, the setting value is restored.

[Entire Configuration]

Figure 5:
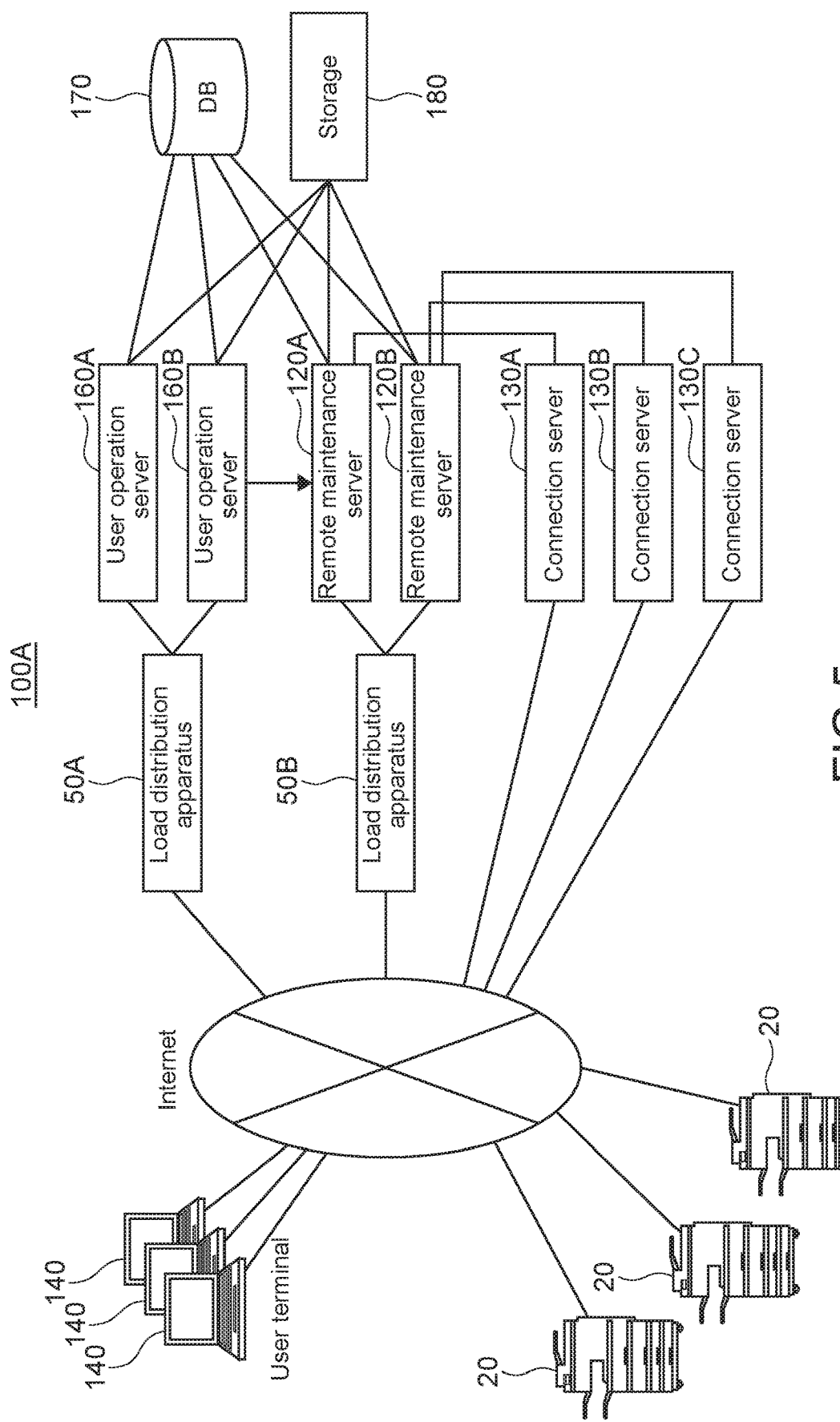
FIG. 5 shows an entire configuration of the remote management system 100A according to a second embodiment of the present disclosure.

Firstly, an entire configuration of the remote management system 100A according to a second embodiment of the present disclosure will be described. FIG. 5 shows an entire configuration of the remote management system 100A according to a second embodiment of the present disclosure.

The remote management system 100A includes the load distribution apparatuses 50 (hereinafter, the load distribution apparatuses 50A and 50B are collectively referred to as the load distribution apparatus(es) 50), the user operation servers 160, the remote maintenance servers 120, the DB (database) 170, the storage 180, the connection servers 130, and the one or more image forming apparatuses 20, which are connected to each other via a network.

End points from the Internet includes the load distribution apparatus 50A, the load distribution apparatus 50B, the connection server 130A, the connection server 130B, and the connection server 130C. The load distribution apparatus 50A distributes accesses from the user terminals 140 to the user operation servers 160A and 160B. The load distribution apparatus 50B distributes accesses from the image forming apparatuses 20 to the remote maintenance servers 120A and 120B.

The load distribution apparatus 50A distributes accesses from the user terminals 140 to the user operation servers 160A and 160B.

The user operation server 160 receives an instruction from a user, which is input from the user terminal 140.

The load distribution apparatus 50B distributes accesses from the image forming apparatuses 20 to the remote maintenance servers 120A and 120B.

The remote maintenance server 120 remotely maintains the image forming apparatuses 20 that the remote maintenance server 120 manages. For example, the remote maintenance server 120 collects daily work information (toner consumption, number of print, etc.) and the setting values of the image forming apparatuses 20, stores the daily work information and the setting values of the image forming apparatuses 20 in the DB 170 and the storage 180, updates firmware of the image forming apparatuses 20.

The DB 170 stores the latest work information and the daily work information. The storage 180 stores the setting values and the daily work information for a long time.

The connection server 130 is a server that executes management connection to the image forming apparatuses 20 in order to send management commands to the image forming apparatuses 20 managed in the remote management system 100A. The management connection is continued until the image forming apparatus 20 is powered off.

The image forming apparatus 20 connected to the network firstly connects to the remote maintenance server 120 via the load distribution apparatus 50B, and obtains a response. The response specifies the connection server 130 to which management connection is to be established. After that, the image forming apparatus 20 shuts down the connection to the remote maintenance server 120, connects to the specified connection server 130, and establishes the management connection.

A user accesses the user operation server 160 via the user terminal 140, and instructs to change a setting value of a certain image forming apparatus 20. Then, the remote maintenance server 120 detects the instruction to change setting, and informs a person-in-charge that the setting value is to be changed. Then, the remote maintenance server 120 sends a setting value change command to the image forming apparatus 20 via the connection server 130, and causes the image forming apparatus 20 to change the setting value.

If the remote maintenance server 120 determines that the changed setting value is an important setting, the remote maintenance server 120 executes a restoring (rollback) process of a setting value.

An entire configuration of the remote management system 100A has been described above. Note that, for example, FIG. 1 shows the three connection servers 130. This is merely an example. Actually, the number of the connection servers 130 is not limited.

[Configuration of Remote Maintenance Server]

Figure 6:
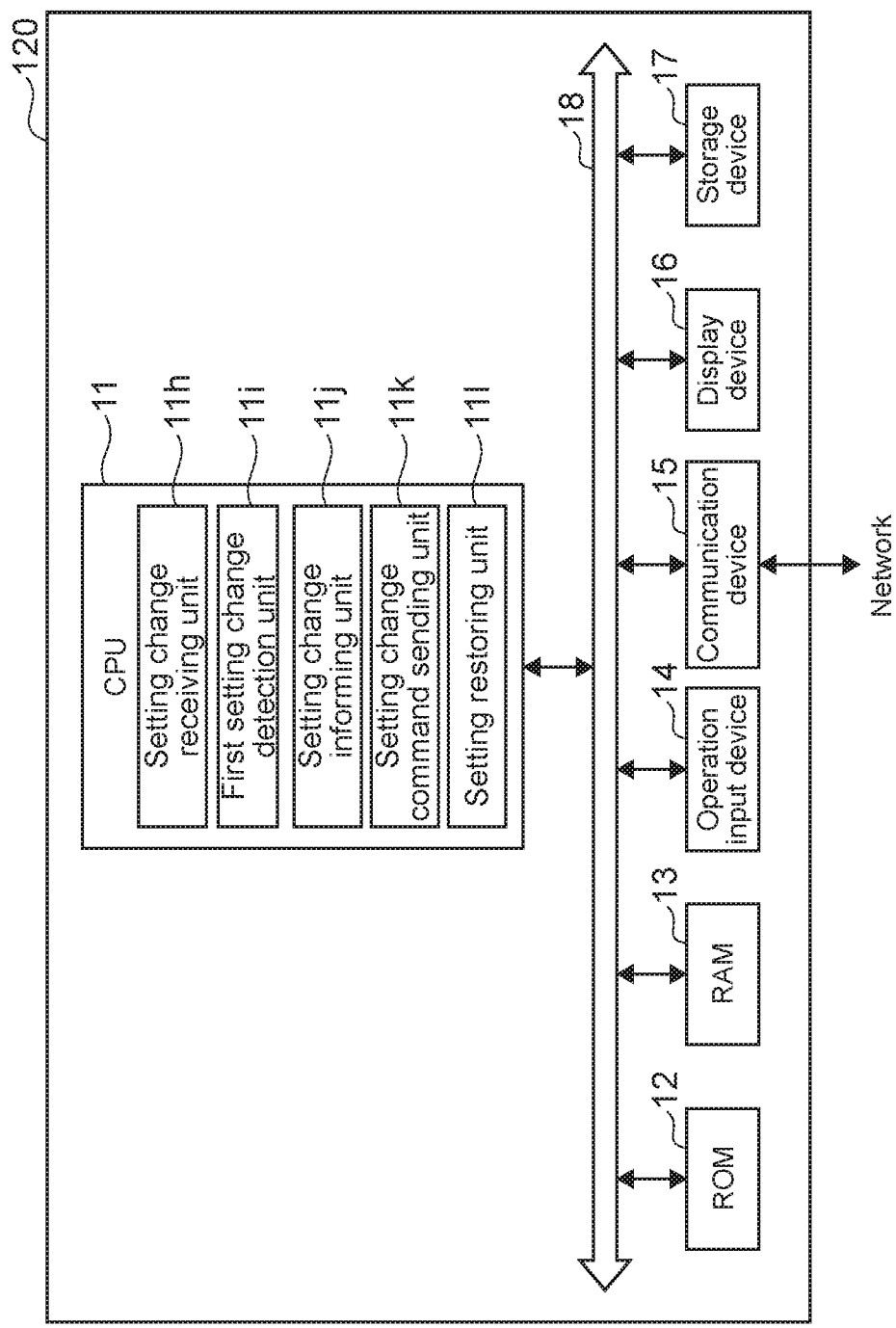
FIG. 6 shows a block configuration of the remote maintenance server 120, where the remote maintenance server 120 is a general-purpose computer.

Next, a configuration of the remote maintenance server 120 will be described. The remote maintenance server 120 may include dedicated hardware or software or a general-purpose computer. FIG. 6 shows a block configuration of the remote maintenance server 120, where the remote maintenance server 120 is a general-purpose computer.

As shown in FIG. 6, the remote maintenance server 120 includes a CPU (Central Processing Unit) 11, a ROM (Read Only Memory) 12, a RAM (Random Access Memory) 13, an operation input device 14, a communication device 15, a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, and various types of data.

The communication device 15 is connected to a network for sending/receiving information to/from apparatuses.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the remote maintenance server 10 realizes are the setting change receiving unit 11h, the first setting change detection unit 11i, the setting change informing unit 11j, the setting change command sending unit 11k, and the setting restoring unit 11l.

The setting change receiving unit 11h receives a setting value change instruction for the image forming apparatus 20 from a user via the user operation server 160.

The first setting change detection unit 11i detects a changed setting value based on the setting value change instruction.

The setting change informing unit 11j informs, via email or the like, an administrator and a user-in-charge of the image forming apparatus 20 of the changed setting value.

The setting change command sending unit 11k sends a command to change setting of the image forming apparatus 20 to the image forming apparatus 20 via the connection server 130.

The setting restoring unit 11l executes a restoring process of restoring an original setting value if an important setting item is changed.

A configuration of the remote maintenance server 120 has been described above.

[Processing Flow]

Figure 7:
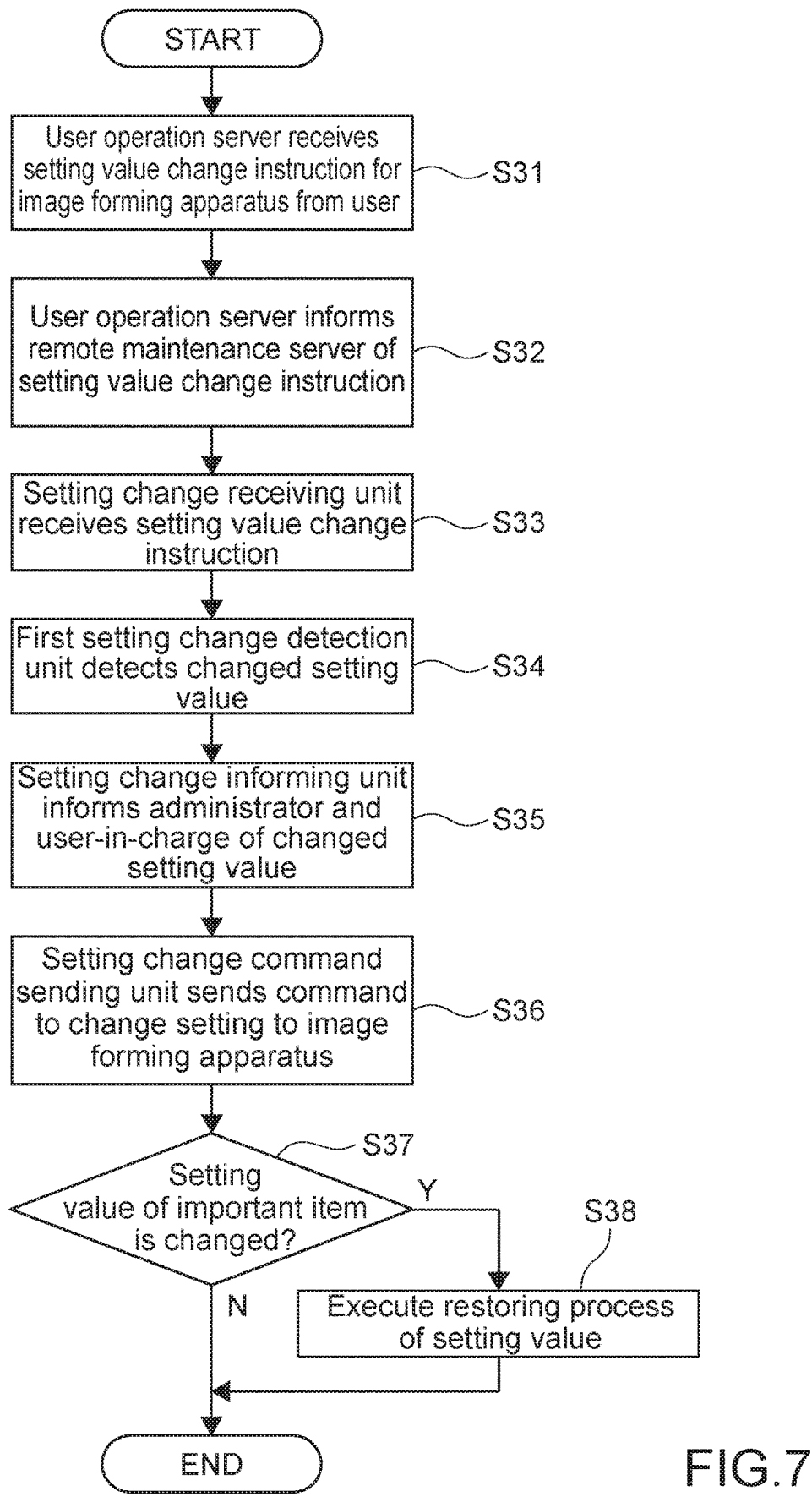
FIG. 7 shows a processing flow of changing a setting value of the image forming apparatus 20, informing a person-in-charge of the setting change, and restoring an important setting value via the remote management system 100A.

Next, a processing flow of changing a setting value of the image forming apparatus 20, informing a person-in-charge of the setting change, and restoring an important setting value via the remote management system 100A will be described. FIG. 7 shows a processing flow of changing a setting value of the image forming apparatus 20, informing a person-in-charge of the setting change, and restoring an important setting value via the remote management system 100A.

Firstly, the user operation server 160 receives a setting value change instruction for the image forming apparatus 20 from a user (Step S31).

Next, the user operation server 160 informs the remote maintenance server 120 of the setting value change instruction (Step S32).

Next, the setting change receiving unit 11h of the remote maintenance server 120 receives a setting value change instruction from the user operation server 160 (Step S33).

Next, the first setting change detection unit 11i of the remote maintenance server 120 detects a changed setting value (Step S34).

Next, the setting change informing unit 11j of the remote maintenance server 120 informs an administrator and a user-in-charge of the image forming apparatus 20 of the changed setting value (Step S35).

Next, the setting change command sending unit 11k sends a command to change setting of the image forming apparatus 20 to the image forming apparatus 20 via the connection server 130 (Step S36).

Next, the setting restoring unit 11l determines whether or not a setting value of an important item is changed (Step S37).

If a setting value of an important item is changed (Step S37, Y), the setting restoring unit 11l executes a restoring process for the changed setting value. The process is finished (Step S38).

If a setting value of an important item is not changed (Step S37, N), the process is finished.

A processing flow of changing a setting value of the image forming apparatus 20, informing a person-in-charge of the setting change, and restoring an important setting value via the remote management system 100A has been described.

Third Embodiment

Next, a third embodiment of the present disclosure will be described. In the aforementioned second embodiment, a setting value of the image forming apparatus 20 is changed via the remote management system 100A. To the contrary, according to a third embodiment described below, a setting value of the image forming apparatus 20 is changed directly.

[Entire Configuration]

Figure 8:
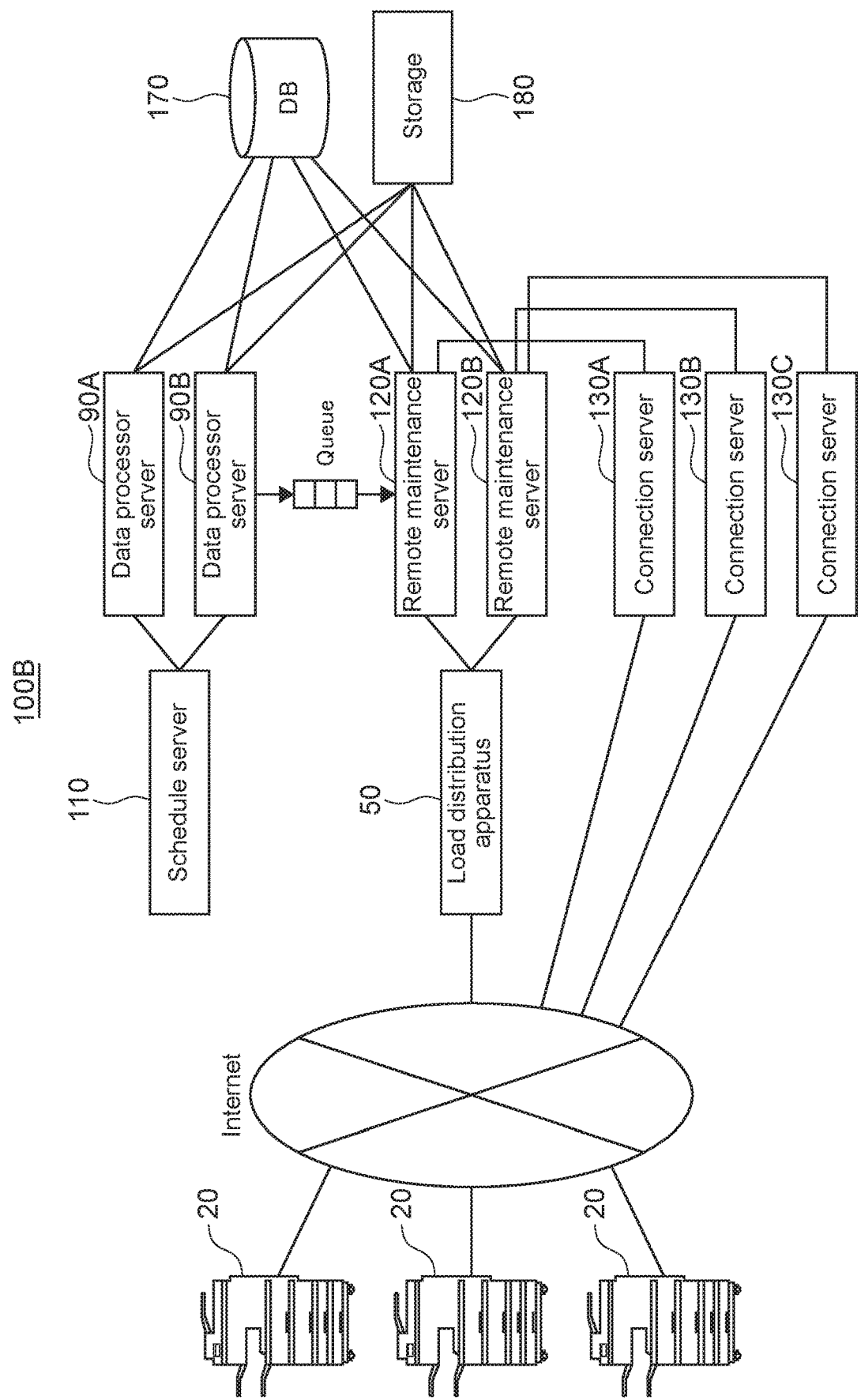
FIG. 8 shows an entire configuration of the remote management system 100B according to a third embodiment of the present disclosure.

Firstly, an entire configuration of the remote management system 100B according to a third embodiment of the present disclosure will be described. FIG. 8 shows an entire configuration of the remote management system 100B according to a third embodiment of the present disclosure.

The remote management system 100B includes the load distribution apparatus 50, the remote maintenance servers 120, the data processor servers 90, the schedule server 110, the DB 170, the storage 180, the connection servers 130, and the one or more image forming apparatuses 20, which are connected to each other via a network.

End points from the Internet includes the load distribution apparatus 50, the connection server 130A, the connection server 130B, and the connection server 130C. The load distribution apparatus 50 distributes accesses from the image forming apparatuses 20 to the remote maintenance servers 120A and 120B.

The load distribution apparatus 50 distributes accesses from the image forming apparatuses 20 to the remote maintenance servers 120A and 120B.

The remote maintenance server 120 remotely maintains the image forming apparatuses 20 that the remote maintenance server 120 manages. For example, the remote maintenance server 120 collects, once a day, daily work information (toner consumption, number of print, etc.) and the setting values of the image forming apparatuses 20, stores the daily work information and the setting values of the image forming apparatuses 20 in the DB 170 and the storage 180, updates firmware of the image forming apparatuses 20.

The DB 170 stores the latest work information and the setting values. The storage 180 stores the work information and the setting values in time series for a long time.

The connection server 130 is a server that executes management connection to the image forming apparatuses 20 in order to send management commands to the image forming apparatuses 20 managed in the remote management system 100B. The management connection is continued until the image forming apparatus 20 is powered off.

The image forming apparatus 20 connected to the network firstly connects to the remote maintenance server 120 via the load distribution apparatus 50, and obtains a response. The response specifies the connection server 130 to which management connection is to be established. After that, the image forming apparatus 20 shuts down the connection to the remote maintenance server 120, connects to the specified connection server 130, and establishes the management connection.

The image forming apparatus 20 directly (not via the remote management system 100B) receives setting change for the image forming apparatus 20 from its operation device, its manager tool, a web server for setting provided by the image forming apparatus 20, a print command, and the like. In this case, the image forming apparatus 20 transmits setting values to the remote management system 100B at regular intervals.

The remote management system 100B stores the setting value transmitted from the image forming apparatus 20 in time series. Then, the remote management system 100B checks change of the setting values at regular intervals. If there is a change, the remote management system 100B informs a person-in-charge of that. In addition, if the setting of an important item is changed, the remote management system 100B executes restoring process of the setting value.

An entire configuration of the remote management system 100B has been described above.

[Configuration of Image Forming Apparatus]

Figure 9:
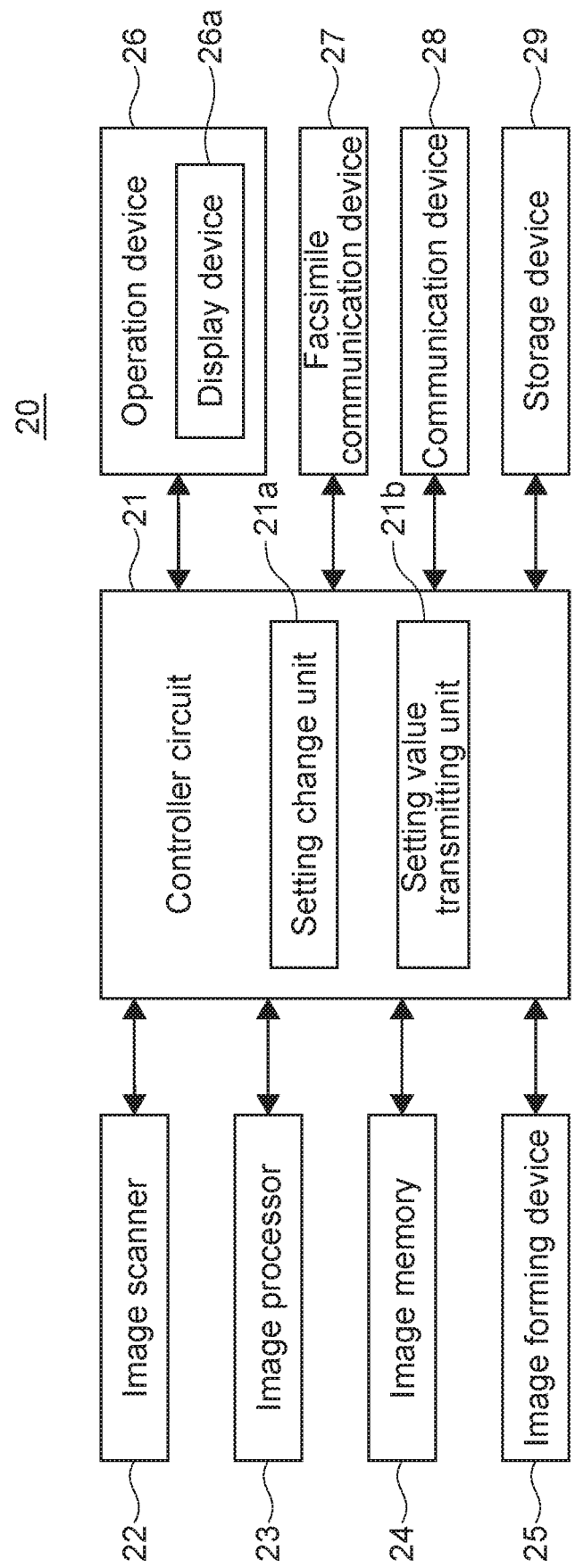
FIG. 9 schematically shows a configuration of the image forming apparatus 20.

Next, a configuration of the image forming apparatus 20 will be described. FIG. 9 schematically shows a configuration of the image forming apparatus 20.

The image forming apparatus 20 includes a controller circuit 21. The controller circuit 21 includes a CPU, a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26a, a facsimile communication device 27, a communication device 28, a storage device 29, and the like. The controller circuit 21 performs operational control of the respective devices connected thereto and sends/receives signals and data to/from those devices.

According to job execution instructions input by a user via the operation device 26 or a personal computer (PC) connected to the network, the controller circuit 21 controls drive and process of mechanisms requisite for executing operational control of functions such as a scanner function, a printing function, a copy function, and a facsimile sending/receiving function.

Further, the controller circuit 21 includes the setting change unit 21a and the setting value transmitting unit 21b. The CPU of the image forming apparatus 20 loads a program, which is stored in a ROM or the like, in a RAM and executes the program. When the CPU of the image forming apparatus 20 executes the program, the CPU operates as the setting change unit 21a and the setting value transmitting unit 21b.

The setting change unit 21a directly receives setting change from the operation device 26, a manager tool, a web server (not shown) for setting provided by the image forming apparatus 20, a print command, and the like, and changes setting of the image forming apparatus. Further, the setting change unit 21a receives setting change on the basis of a setting change command received from the remote management system 100B (in restoring process). The setting change unit 21a changes the setting of the image forming apparatus 20.

The setting value transmitting unit 21b transmits setting values of the image forming apparatus 20 to the remote management system 100B (the remote maintenance server 120) at regular intervals.

The image scanner 22 reads an image from a script.

The image processor 23 carries out an image process as necessary on image data of an image read by the image scanner 22. For example, the image processor 23 corrects shading of an image read by the image scanner 22 and carries out other image process to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processes executable by the image forming apparatus 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses (the remote maintenance server 120, the connection server 130, etc.) connected to the network via a LAN connected to the communication device 28, and the like.

The storage device 29 stores a script image read by the image scanner 22 and the like. The storage device 29 is a large-volume storage device such as an HDD.

A configuration of the image forming apparatus 20 has been described above.

[Configuration of Remote Maintenance Server]

Figure 10:
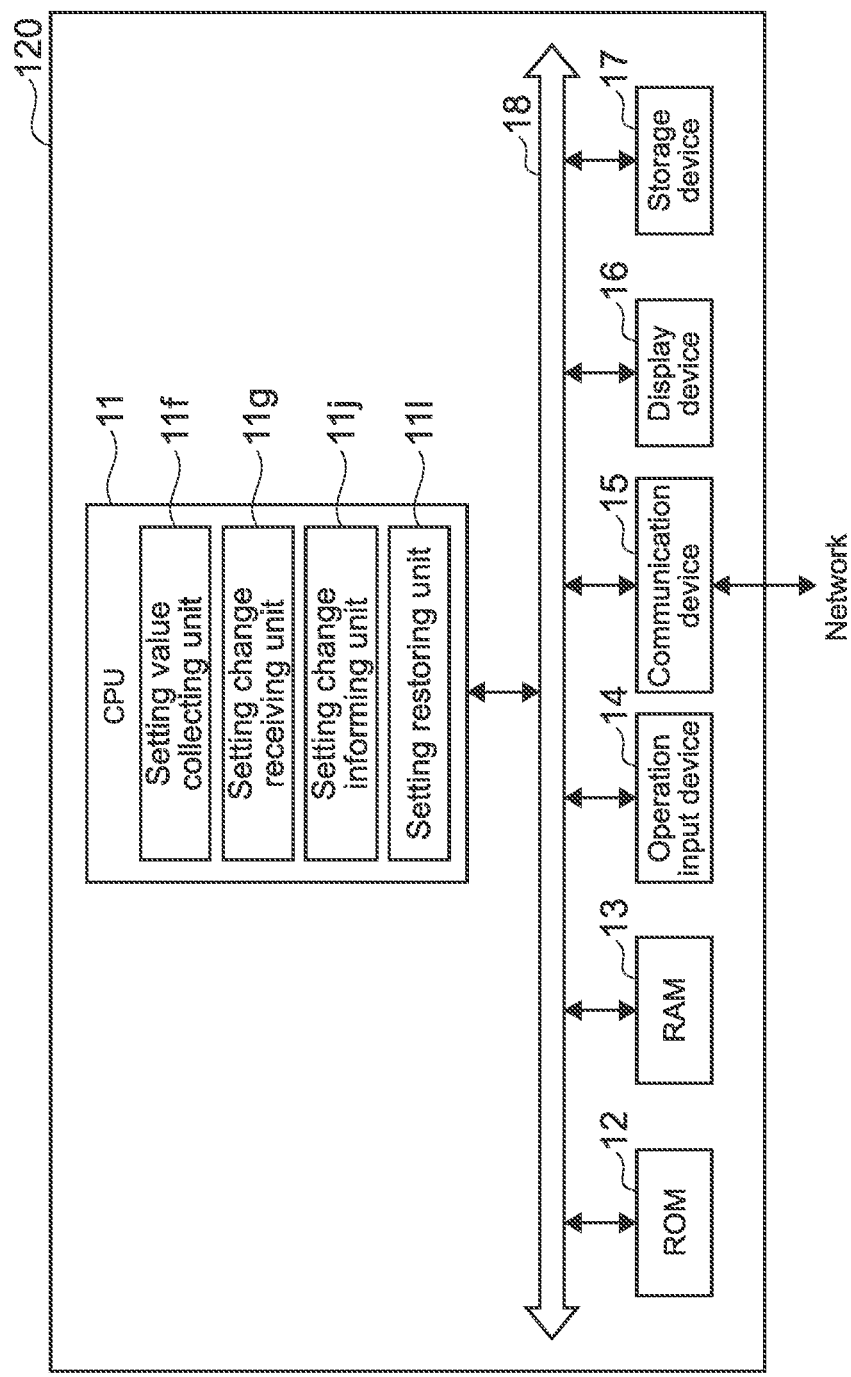
FIG. 10 shows a block configuration of the remote maintenance server 120, where the remote maintenance server 120 is a general-purpose computer.

Next, a configuration of the remote maintenance server 120 will be described. The remote maintenance server 120 may include dedicated hardware or software or a general-purpose computer. FIG. 10 shows a block configuration of the remote maintenance server 120, where the remote maintenance server 120 is a general-purpose computer.

As shown in FIG. 10, the remote maintenance server 120 includes a CPU 11, a ROM 12, a RAM 13, an operation input device 14, a communication device 15, a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS, various applications being executed, and various types of data being processed.

The storage device 17 is, for example, an HDD, a flash memory, or other nonvolatile memories. The storage device 17 stores the OS, various applications, and various types of data.

The communication device 15 is connected to a network for sending/receiving information to/from apparatuses.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the remote maintenance server 10 realizes are the setting value collecting unit 11*f*, the setting change receiving unit 11*g*, the setting change informing unit 11*j*, and the setting restoring unit 11*l*.

The setting value collecting unit 11*f* collects setting values from the image forming apparatus 20 at regular intervals, and stores the setting values in time series in the storage 180 and the like.

The setting change receiving unit 11*g* receives, via a queue, the changed setting value detected by the data processor server 90 from the data processor server 90.

The setting change informing unit 11*j* informs, via email or the like, an administrator and a user-in-charge of the image forming apparatus 20 of the changed setting value.

The setting restoring unit 11*l* executes a restoring process of restoring an original setting value if an important setting item is changed.

A configuration of the remote maintenance server 120 has been described above.

[Configuration of Data Processor Server]

Figure 11:
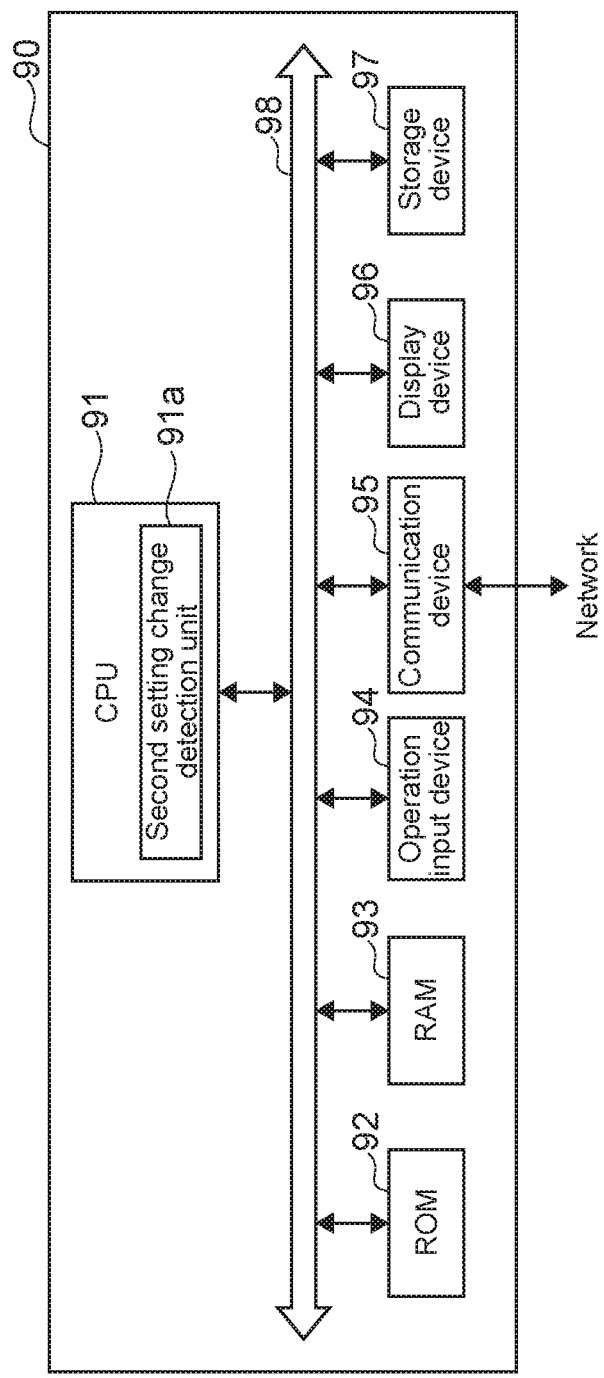
FIG. 11 shows a block configuration of the data processor server 90, where the data processor server 90 is a general-purpose computer.

Next, a configuration of the data processor server 90 will be described. The data processor server 90 may include dedicated hardware or software or a general-purpose computer. FIG. 11 shows a block configuration of the data processor server 90, where the data processor server 90 is a general-purpose computer.

As shown in FIG. 11, the data processor server 90 includes a CPU 91, a ROM 92, a RAM 93, an operation input device 94, a communication device 95, a display device 96, a storage device 97, and these blocks are connected to each other via a bus 98.

The ROM 92 stores a plurality of programs such as firmware for executing various types of process, and data. The RAM 93 is used as a work area of the CPU 91 and temporarily stores an OS, various applications being executed, and various types of data being processed.

The storage device 97 is, for example, an HDD, a flash memory, or other nonvolatile memories. The storage device 97 stores the OS, various applications, and various types of data.

The communication device 95 is connected to a network for sending/receiving information to/from apparatuses.

Of the plurality of programs stored in the ROM 92 or the storage device 97, the CPU 91 loads a program in the RAM 93 in response to a command input via the operation input device 94, and appropriately controls the display device 96 and the storage device 97 according to the loaded program.

The operation input device 94 is, for example, a pointing device such as a mouse, a keyboard, a touch panel, or other operation devices.

The display device 96 is, for example, a liquid crystal display, an EL (Electro-Luminescence) display, or a plasma display.

Next, functional blocks will be described. When the CPU 91 executes a program, the CPU 91 operates as the functional blocks described below.

The functional block that the CPU 91 of the data processor server 90 realizes is the second setting change detection unit 91*a*.

The second setting change detection unit 91*a* is activated triggered by the schedule server 110. The second setting change detection unit 91*a* checks the setting values stored in time series in the storage 180, checks whether or not the setting value is changed, and informing, via a queue, the remote maintenance server 120 of the changed setting value if the setting value is changed.

A configuration of the data processor server 90 has been described above.

[Processing Flow (Changing and Collecting Setting Value)]

Figure 12:
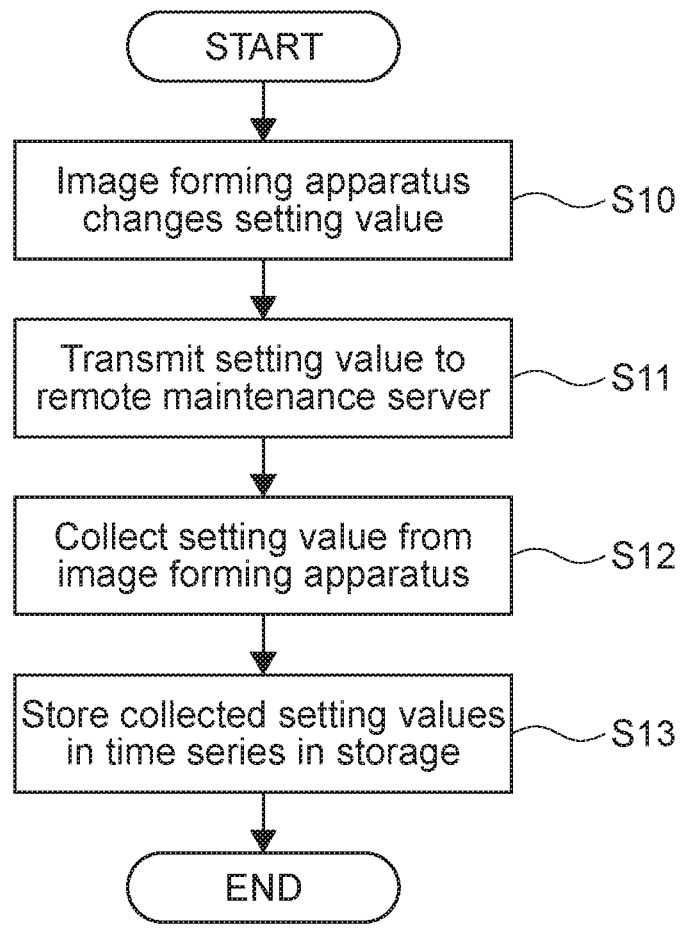
FIG. 12 shows a processing flow of changing a setting value by the image forming apparatus 20 and collecting the setting value by the remote management system 100B.

Next, a processing flow of changing a setting value by the image forming apparatus 20 and collecting the setting value by the remote management system 100B will be described. FIG. 12 shows a processing flow of changing a setting value by the image forming apparatus 20 and collecting the setting value by the remote management system 100B.

Firstly, the setting change unit 21*a* of the image forming apparatus 20 receives setting change, and changes the setting of the image forming apparatus 20 (Step S10).

Next, the setting value transmitting unit 21*b* of the image forming apparatus 20 transmits the setting value of the image forming apparatus 20 to the remote maintenance server 120 (Step S11). The setting value transmitting unit 21*b* may transmit the setting value every time the setting value is changed, or at regular intervals, for example, once a day.

Next, the setting value collecting unit 11*f* of the remote maintenance server 120 receives the setting value transmitted from the image forming apparatus 20, and collects the setting value (Step S12).

Next, the setting value collecting unit 11*f* of the remote maintenance server 120 stores the collected setting values in time series in the storage 180 (Step S13).

A processing flow of changing a setting value by the image forming apparatus 20 and collecting the setting value by the remote management system 100B has been described above.

[Processing Flow (Detecting Change of Setting Value, Informing Person-in-Charge of that, and the Like)]

Figure 13:
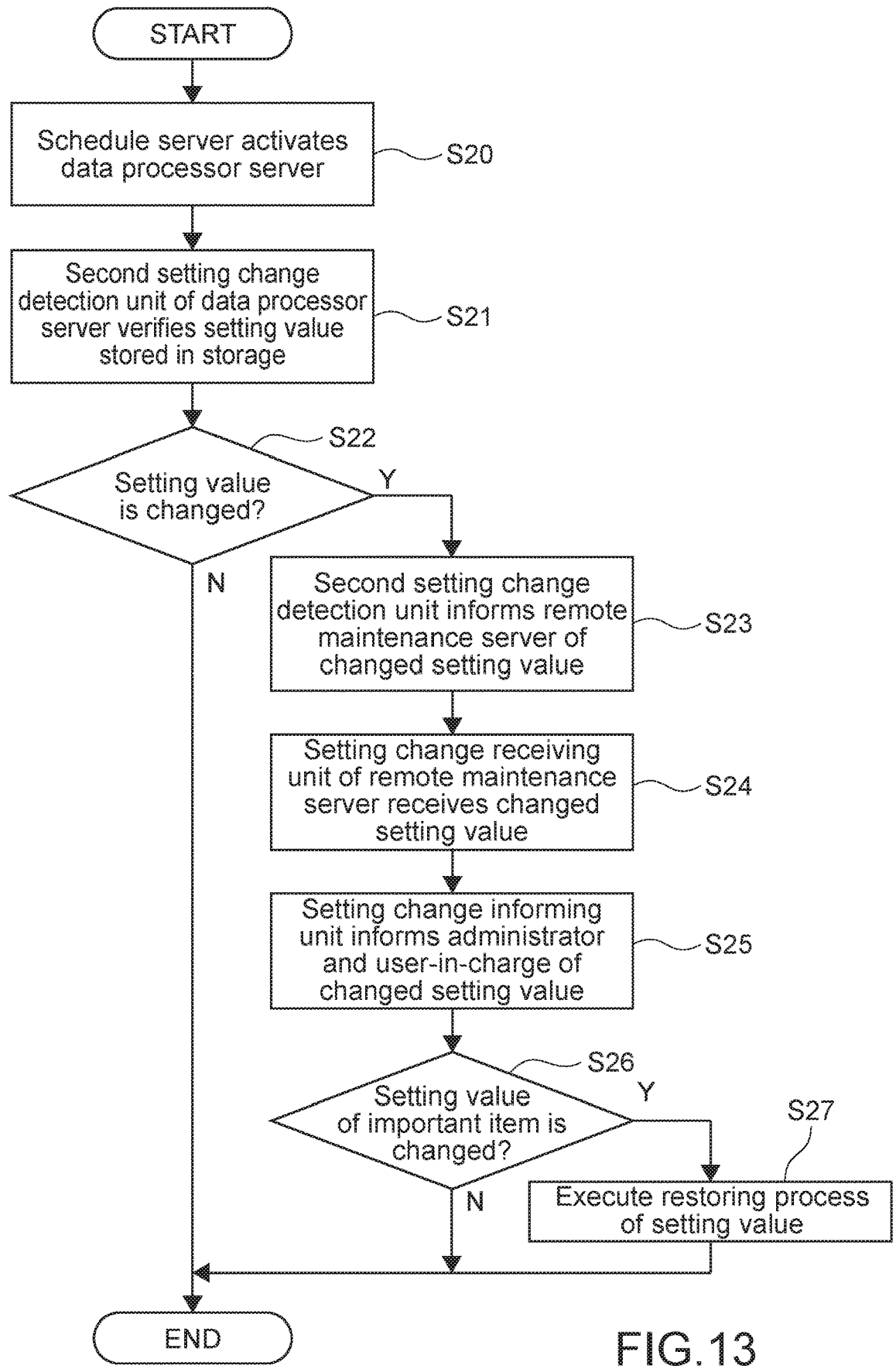
FIG. 13 shows a processing flow of detecting change of a setting value, informing a person-in-charge of that, and restoring an important setting value by the remote management system 100B.

Next, a processing flow of detecting change of a setting value, informing a person-in-charge of that, and restoring an important setting value by the remote management system 100B will be described. FIG. 13 shows a processing flow of detecting change of a setting value, informing a person-in-charge of that, and restoring an important setting value by the remote management system 100B.

Firstly, the schedule server 110 activates the data processor server 90 (Step S20).

Next, the second setting change detection unit 91a of the data processor server 90 verifies the setting value stored in the storage 180 (Step S21).

Next, the second setting change detection unit 91a of the data processor server 90 determines whether or not the setting value is changed (Step S22).

If the setting value is not changed (Step S22, N), the process is finished.

If the setting value is changed (Step S22, Y), next, the second setting change detection unit 91a informs, via a queue, the remote maintenance server 120 of the changed setting value (Step S23).

Next, the setting change receiving unit 11g of the remote maintenance server 120 retrieves and receives the changed setting value from the queue (Step S24).

Next, the setting change informing unit 11j of the remote maintenance server 120 informs an administrator and a user-in-charge of the image forming apparatus 20 of the changed setting value (Step S25).

Next, the setting restoring unit 11l of the remote maintenance server 120 determines whether or not the setting value of an important item is changed (Step S26).

If the setting value of an important item is changed (Step S26, Y), the setting restoring unit 11l executes a restoring process of restoring an original setting value. The process is finished (Step S27).

If the setting value of an important item is not changed (Step S26, N), the process is finished.

a processing flow of detecting change of a setting value, informing a person-in-charge of that, and restoring an important setting value by the remote management system 100B has been described above.

[Notes]

It should be understood by those skilled in the art that various modifications, combinations, sub-combinations and alterations may occur depending on design requirements and other factors insofar as they are within the scope of the appended claims or the equivalents thereof

What is claimed is:

1. A remote management system, comprising:
a data processor server;
a remote maintenance server;
a storage; and
a connection server,
the data processor server, the remote maintenance server, the storage, and the connection server being connected to each other via a network,
the data processor server including a first processor and a first memory that stores a first information processing program, when the first processor executes the first information processing program, the first processor operating as
a latest update date-and-time check unit that checks latest update date-and-time of work information of an image forming apparatus stored in the storage,
a data loss check unit that checks loss of the work information,
a re-obtained data length calculation unit that calculates data length of the work information to be re-obtained,
a re-obtaining start time determination unit that determines time at which the work information is to be re-obtained from the image forming apparatus, and
a re-obtain request sending unit that adds the re-obtain request into a queue, and sends the queue to the remote maintenance server, the re-obtain request having the determined data length and re-obtaining start time,
the remote maintenance server including a second processor and a second memory that stores a second information processing program, when the second processor executes the second information processing program, the second processor operating as
a work information collecting unit that collects the work information from the image forming apparatus, and stores the collected work information in the storage,
a re-obtain request receiving unit that retrieves and receives the re-obtain request from the queue,
a re-obtain request conversion unit that converts the re-obtain request into a re-obtain command, the re-obtain command having a format that the image forming apparatus can interpret, and
a re-obtain command sending unit that sends the converted re-obtain command via the connection server to an image forming apparatus, the image forming apparatus requesting to re-obtain the work information.

2. The remote management system according to claim 1, wherein
the re-obtaining start time determination unit determines, as the time at which the work information is to be re-obtained from the image forming apparatus, time at which a load of the remote management system is small.

3. The remote management system according to claim 1, wherein
the re-obtained data length calculation unit divides the work information to be re-obtained if the data length of the re-obtain work information is larger than a threshold.

* * * * *